United States Patent Office 2,829,599
Patented Apr. 8, 1958

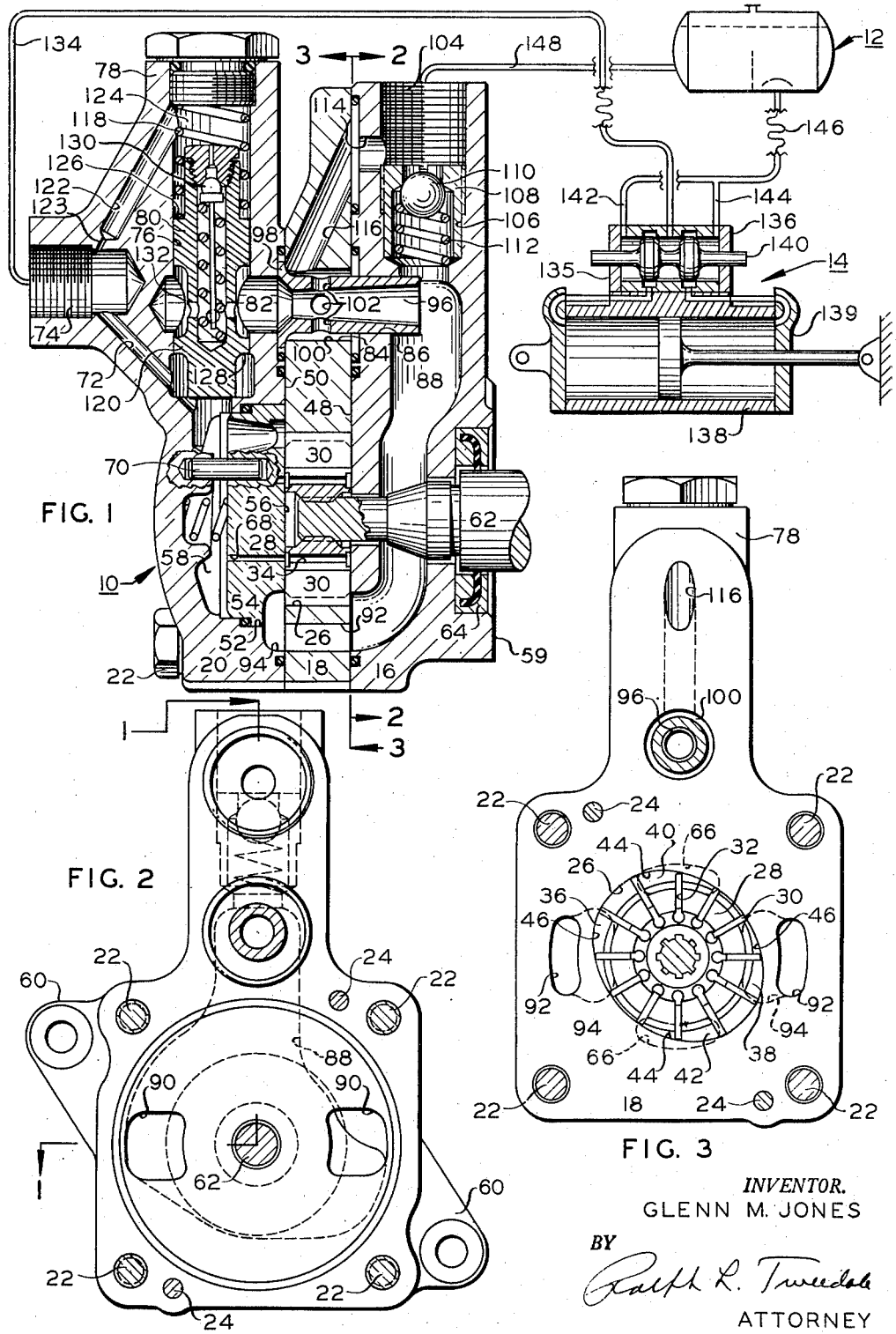

2,829,599

POWER TRANSMISSION

Glenn M. Jones, Farmington, Mich., assignor to Vickers Incorporated, Detroit, Mich., a corporation of Michigan Application February 17, 1954, Serial No. 410,791

3 Claims. (Cl. 103—42)

This invention relates to power transmissions, and is particularly applicable to those of the type comprising two or more fluid pressure energy translating devices, one of which may function as a pump and another as a fluid motor.

More particularly the invention relates to rotary pumping structure for use in such a transmission.

The invention also relates to means for increasing the pressure in the inlet zones of such a mechanism and to a novel fluid circuit for achieving this end.

The invention is especially applicable to pumping mechanism for use in actuating fluid operated accessories on a motor vehicle. The wide public acceptance of fluid actuated devices such as hydraulic power steering, power actuated hydraulic window lifts etc., has created a demand for a pumping structure which must meet requirements far beyond anything met in normal industrial hydraulic applications. Simplicity, ruggedness of construction, low cost, long life and efficient operation are of paramount importance in the design of such a unit. Further, compactness and quietness of operation are highly important criteria of such a unit.

Due to the crowded conditions in the engine compartment of present day vehicles, and in the interest of cost reduction, it has been proposed to mount the fluid pumping mechanism at one end of the vehicle generator and to power it by an extension of the generator armature shaft. Such a mounting accomplishes the desired space saving and cost reduction, but has introduced a new problem due to the extremely high speeds involved in generator operation. The speed of a generator driven by the engine of a motor vehicle may reach speeds of the order of 10,000 revolutions per minute. At speeds of this magnitude the inlet zones of the pumping unit may fail to fill completely resulting in the phenomena of cavitation, with its attendant noise and excessive wear.

Fluid requirements of motor vehicle accessories such as hydraulic steering boosters may be as high when the engine is idling as they are when it is at high speed, thus a fluid pump to supply those accessories must have a substantial delivery rate while the engine idles. Since the speed of a motor vehicle engine varies in the ratio of approximately 1 to 10 from idle to full speed, the output of a pump coupled to a directly driven generator will vary in the same ratio, resulting in excessive delivery rates with resultant power loss during highway operation. Spillover type flow control valves responsive to the pump delivery rate have been found an effective solution to this problem.

Since increased pressure in the pump inlet zones, or supercharging, is required only at higher speeds and since it is only in the higher speed ranges that the flow control valve becomes effective to by-pass fluid, the by-passed fluid can be passed through a venturi throat and utilized to supercharge the pump inlet zones. Such an arrangement achieves a timely change from nonsupercharged to supercharged operation and has met with wide acceptance.

It is an object of this invention to provide means for increasing the inlet pressure of a pumping mechanism which utilizes fluid by-passed by a spillover type flow control valve, but which is simpler, less expensive and more compact than prior devices.

More particularly it is an object of this invention to provide pumping mechanism incorporating flow control means, and inlet zone supercharging means, in which the disposition of the components is such as to occupy minimum space while affording maximum simplicity.

A further object of this invention is to provide a novel circuit for supercharging the inlet zones of a pumping mechanism which makes possible use of a remotely located fluid reservoir and yet requires only one delivery and one return conduit extending from the pumping mechanism.

It is a further object of this invention to provide such a system in which, during nonsupercharged operation, the inlet zones are supplied with fluid at an absolute pressure high enough to prevent cavitation.

Further objects and advantages of the present invention will be apparent from the following description, reference being had to the accompanying drawing wherein a preferred form of the present invention is clearly shown.

In the drawing:

Figure 1 is a longitudinal sectional view of pumping structure built according to the present invention and showing associated therewith a schematic hydraulic circuit.

Figure 2 is a sectional view taken on line 2—2 of Figure 1.

Figure 3 is a section taken on line 3—3 of Figure 1.

Referring now to Figure 1, there is shown a pump generally designated 10, a reservoir generally designated 12, and a fluid actuated servo motor of the follow-up type generally designated 14. The pump 10 includes a body member 16, a ring, or stator, member 18 and a head member 20 arranged in a sandwich relation and secured together by a plurality of bolts 22, which extend through the head 20 and stator 18 into threaded holes in the body 16. The proper angular relation between the body 16, the stator 18, and head 20 is maintained by dowels 24 as seen in Figures 2 and 3. The ring, or stator, element 18 has a generally elliptically contoured bore 26 therein. A rotor 28 carrying a plurality of vanes 30 slidable in substantially radial slots 32, is positioned in bore 26 in a telescopic relation with the stator 18. During operation of the pump the ends of the vanes 30 are maintained radially outward against the bore 26 by centrifugal force aided by pressure conducted to the inner ends of the vanes through a pair of annular channels 34 which intersect the enlarged inner ends of slots 32.

The spaces between the adjacent vanes may be termed working chambers and it should be noted that each has a complementary working chamber diametrically opposed thereto. For example chambers 36 and 38 are a complementary pair as are chambers 40 and 42. Assuming clockwise rotation of the rotor 28 as viewed in Figure 3, it can be seen that the chambers 36 and 38 are at the moment increasing in volume while chambers 40 and 42 are decreasing. Those portions of the space between the ring and the rotor through which the working chambers pass while decreasing in size may be termed outlet zones 44 while those through which they pass while increasing in size may be termed inlet zones 46. Since each zone has a diametrically opposed complementary zone, hydraulically balanced pumping action is provided. Such pumping mechanism is described in more detail in U. S. patent No. 1,989,900, to Harry F. Vickers.

Body 16 includes a plane face 48 which axially abuts stator 18 and against which rotor 28 and the vanes 30 are axially slidable. The axially opposed end of stator 18 is abutted by a plane face 50 of the head 20. A recess 52 extends into head 20 from the face 50. A pressure plate 54 is axially slidable in recess 52 and has a face 56 which axially abuts stator 18, rotor 28 and the vanes 30. Pressure plate 54 is in peripheral sealing engagement with recess 52 and cooperates therewith to form a pressure chamber 58. It can be seen that pressure in chamber 58 will bias pressure plate 54 axially into engagement with stator 18, rotor 28 and vanes 30. Further, since rotor 28 is made slightly thinner than stator 18, to provide running clearance, pressure in chamber 58 will induce deflection of the plate 54 into the bore 26 toward rotor 28 thus reducing end clearance and leakage at high pressures. The sealing action of pressure plate 54 is described in more detail in the patent to Duncan B. Gardiner, et al., No. 2,544,988.

The body 16 of pump 10 is provided with a mounting face 59 and has a pair of ears 60 which are utilized to secure the pumping mechanism to the end bell of a generator not shown. An extension 62 of the generator shaft is spline connected to the rotor 28 of pump 10 and serves as the drive shaft therefor. A shaft seal 64 in pump body 16 prevents leakage around the shaft 62 at its point of emergence from the body.

As heretofore noted, the working chambers between adjacent vanes are decreasing in size as they pass through the outlet zones 44. A pair of kidney shaped outlet ports 66 overlie the outlet zones 44 and extend completely through the pressure plate 54 into pressure chamber 58. Fluid displaced by the pumping mechanism passes through ports 66 to pressure chamber 58, where operating pressure of the unit thus exists. Drilled passages 68 extend through the pressure plate 54 to communicate with the annular channel 34 for a purpose heretofore mentioned.

A dowel pin 70 extends from head 20 into pressure plate 54 to maintain the desired annular relations therebetween.

From chamber 58 fluid displaced by the pumping mechanism passes through a delivery passage 72 to an external delivery connection port 74. A stepped valve bore 76 extends radially inward of the pumping structure from a boss 78 to intersect the pressure chamber 58. Valve bore 76 has therein a combination flow controlling and pressure relief valve 80, the operation of which will be hereinafter discussed. An axial bore 82 extends into the head 20 from the face 50 to intersect the valve bore 76. An axial bore 84 extends through the stator 18 and is coincident with the bore 82 at the juncture of head 20 and stator 18. A third passage 86 is coaxial with bores 82 and 84 and extends from the face 48 of the body member 16 to the interior thereof, where it communicates with an inlet manifold 88.

Inlet manifold 88 extends to communicate with inlet ports 90 in the face 48 of the body member 16. The ports 90 overlie the inlet zones 46 and extend outwardly to communicate with crossover passages 92 in the stator 18. Passages 92 extend through the stator to communicate with auxiliary inlet ports 94 which are formed in the head 20 and pressure plate 54.

A venturi member 96 extends through passages 84 and 86 to establish communication between the axial bore 82 and the inlet manifold 88. The venturi member 96 is provided with a flange at 98 which is clamped between the head member 20 and the stator 18 on assembly of the pumping mechanism. Note that the bore 86 encircles the venturi member 96 to provide an annular clearance space 100. Bore 86 however, is smaller than bore 84 and engages the exterior of venturi member 96 in fluid sealing engagement. Venturi member 96 has the usual constricted throat therein and a plurality of radial passages 102 provide communication between the throat of the venturi and the annular clearance space 100 surrounding the exterior of the venturi member. Venturi member 96 and the valve 80 cooperate to provide increased pressure, or supercharge, for the pump inlet zones during high speed operation, as later described.

A threaded external connection port 104 is provided in the body member 16. Extending from the connection port 104, a branched return passage is provided. The first branch is provided by a stepped bore 106 which extends radially inward from the connection port 104 to intersect the inlet manifold 88. A valve seat 108 is threaded into the passage 106 and has therein a check valve 110 which is biased by a spring 112 in a direction such as to provide relatively free flow from port 104 to manifold 88 and to block return flow.

The other branch of the return passage includes an axial passage 114 which extends from port 104 to the face 48 of body member 16 where it is coincident with an angularly extending passage 116 drilled into the stator 18 to intersect the bore 86 and thus communicate with the annular chamber 100, which surrounds venturi member 96.

The valve member 80 is biased by the spring 118 to the position illustrated, wherein the land 120 isolates the pressure chamber 58 from the axial passage 82. As heretofore discussed, fluid displaced by the pumping mechanism is discharged through outlet passage 72. Note that outlet passage 72 is of a relatively small cross section and thus acts as a restriction to flow from the pumping mechanism. A drilled passage 122 having a restriction 123 therein, extends from the connection port 74 to a pressure chamber 124 at the outer end of valve bore 76. It can be seen that pressure conducted by the passage 122 to the pressure chamber 124 will be that downstream from the restriction created by outlet passage 72, and that it reacts against the projection of area 126 to produce a force which aids spring 118 in biasing the valve 80 to the position illustrated. Pressure in chamber 58 reacts against the projection of area 128 tending to move the spool 80 against the spring 118, and the force on the spool created by pressure in chamber 124. The restricted passage 72 thus acts as a metering orifice, pressure at the opposite sides of which is exerted upon equal and opposed areas of the valve 80.

Until the pressure drop through passage 72 is sufficient to compress spring 118, the entire output of the pumping mechanism will go through passage 72 to the external delivery connection port 74. As the speed of the pump increases the increased flow through the restricted passage 72 causes sufficient pressure drop to overcome the biasing force of spring 118, and spool 80 will move outward. Land 120 will move across and uncover the axial passage 82 thus venting pressure chamber 58 through the venturi 96 to the inlet manifold 88 which, as heretofore noted, communicates with the inlet zones of the pumping mechanism. As the pump delivery volume increases past the cracking point of the valve 80, the valve will open wider thus by-passing an increasingly greater part of the pump delivery. At all speeds above the cracking point of valve 80 the valve will tend to maintain the pressure drop through the restricted outlet passage 72 constant, thereby maintaining the flow rate therethrough constant.

Valve 80 has an additional function in that it operates as a pilot controlled relief valve. The pilot valve 130 is positioned in the central bore in valve 80 and is spring biased to a closed position. The central bore in the spool 80 is vented to the passage 82 through a plurality of holes 132. When the pressure in the pump outlet passage, and consequently chamber 124, reaches a predetermined maximum, the valve 130 will be opened to vent the chamber 124. Due to the constriction 123 in passage 122, a pressure drop will occur in chamber 124, creating a pressure unbalance which will cause valve 80 to shift outward and unload the pump by establishing communication between pressure chamber 58 and the axial passage 82. Operating pressures are thus kept within safe limits.

A delivery conduit 134 extends from the external connection port 74 of the pump 10 to the central port of a conventional 4 way, open center directional valve 135. The valve body 136 is mounted on the movable part 138 of a fluid motor 139, thus the linear movements imparted to the valve spool 140 will be duplicated by the fluid motor to provide a follow-up type of system. Such an arrangement is typical of most hydraulic steering systems. A pair of conduits 142 and 144 extend from the ends of the directional valve and are connected to a conduit 146 which leads to the interior of the reservoir 12. A conduit 148 extends from the reservoir 12 to the return connection port 104 in the body member 16 of the pumping mechanism. Thus with the valve spool of the directional valve in the neutral position, as illustrated, flow from the pumping mechanism will pass through the outlet passage 72 to the external connection port 74, from there through the conduit 134, over the lands of the directional valve spool 140, through the conduits 142 and 144 to the reservoir, and return to the pumping mechanism through conduit 148. During the actual steering operation a portion, or all, of the pump output will be diverted to one of the ends of the motor, while fluid rejected from the other end of the motor will maintain flow in the return circuit relatively constant.

In operation, the shaft 62 will be connected to the engine of a motor vehicle. During low speed operation the entire output of the pumping mechanism will pass through the pressure chamber 58, through the outlet passage 72, and to the servo motor 14. Fluid returning from the servo motor will pass through the reservoir 12, the conduit 148, and into the return connection port 104. During extremely low speed operation, the entire quantity of fluid needed to fill the inlet zones of the pumping mechanism may pass through passages 114 and 116 to the annulus 100, and will pass through the radial holes 102 and the throat of the venturi into the inlet manifold 88. As the pump speed increases the restriction to flow through the annulus 100 and the radial passages 102 becomes undesirably high and might cause cavitation in the pump inlet zones. However, when the pressure in the inlet manifold 88 falls a very slight amount below atmospheric, the light spring 112 biasing the check valve 110 to the closed position is overcome, and fluid from the return port 104 can pass directly into the inlet manifold 88, thus providing an adequate supply of fluid for the inlet zones during operation in the low and intermediate speed ranges.

As the pump speed increases further the delivery rate will reach the point where the valve 80 becomes effective to by-pass a portion of the pump delivery into the passage 82 and through the venturi 96. The constricted throat of the venturi will induce a high velocity which in accordance with recognized physical principles is accompanied by a relatively low static pressure. The low pressure in the throat of the venturi enables atmospheric pressure on the fluid in the reservoir to force fluid into the rapidly moving by-pass fluid. The by-pass fluid and the fluid picked up at the throat of the venturi spurt into the relative quiescence of the large areas of the return manifold, wherein the kinetic energy of the rapidly moving jet is converted to static pressure at the inlet ports. This pressure increase is effective to cause the inlet zones to be completely filled, thus avoiding cavitation. The increase in pressure thus produced in the manifold 88 is effective to close the ball valve 110 to permit the build-up of supercharge pressure.

Particular attention is called to the extremely compact pumping mechanism provided by the disposition of the pumping mechanism components taught by the present invention.

The invention has further provided pumping mechanism in which the inlet zones are supercharged to prevent cavitation at high speeds and which requires only a single delivery and a single return connection between the pumping mechanism and the external circuit. One of the major advantages of this arrangement is that a reservoir of any desired size may be utilized and it may be located at any convenient point in the engine compartment without requiring complicated piping arrangements.

While the form of embodiment of the invention as herein disclosed constitutes a preferred form, it is to be understood that other forms might be adopted, all coming within the scope of the claims which follow.

What is claimed is as follows:

1. Pumping mechanism for use with a variable speed prime mover, comprising: a stator; a rotor telescopically disposed in said stator, said rotor and stator having inlet and outlet zones therebetween; a body member axially abutting one side of said stator and rotor; a head member axially abutting the other side of said stator and rotor; inlet port means in said body adjacent said inlet zone; outlet port means in said head adjacent said oulet zone; delivery conduit means extending from said outlet port; flow controlling means in said head responsive to flow in said delivery conduit to divert flow therefrom; means forming a by-pass passage, for the diverted flow, leading to said inlet zone, said by-pass passage having a constricted portion extending through said stator for inducing a localized relatively high flow rate in said diverted flow; means forming a branched return passage, one branch extending into said stator to communicate with said by-pass passage in the region of high flow rate, the other branch extending into said head to communicate directly with said inlet zone; and valve means in said other branch blocking flow from said inlet zone but permitting relatively free flow toward said inlet zone, whereby flow in said other branch will take place only toward said inlet zone to aid in the filling thereof.

2. Pumping mechanism for use with a variable speed prime mover, comprising: a stator; a rotor telescopically disposed in said stator, said rotor and stator having inlet and outlet zones therebetween; a body member axially abutting one side of said stator and rotor; a head member axially abutting the other side of said stator and rotor; inlet port means in said body adjacent said inlet zone; outlet port means in said head adjacent said outlet zone; a pair of external connection ports, one in said head member and the other in said body member; delivery conduit means in said head interconnecting said outlet zone and said one external connection port; flow controlling means in said head responsive to flow in said delivery conduit to divert fluid therefrom; means forming a by-pass passage, for the diverted flow, leading to said inlet zone, said by-pass passage having a constricted portion extending through said stator for inducing a localized relatively high flow rate in said diverted flow; means forming a branched return passage extending from said other external connection port, one branch extending into the stator to communicate with said by-pass passage in the region of high flow rate, the other branch lying entirely within said body member and extending to communicate with said inlet port means; and valve means in said other branch blocking flow from said inlet zone but permitting relatively free flow toward said inlet zone, whereby flow in said other branch will take place only toward said inlet zone to aid in the filling thereof.

3. Pumping mechanism for use with a variable speed prime mover, comprising: a stator; a rotor telescopically disposed in said stator, said rotor and stator having inlet and outlet zones therebetween; a body member axially abutting one side of said stator and rotor; a head member axially abutting the other side of said stator and rotor; inlet port means in said body adjacent said inlet zone; outlet port means in said head adjacent said outlet zone; delivery conduit means in said head extending from said outlet port; a radial valve bore in said head communicating with said delivery conduit; an axial bore in said head intersecting said valve bore; passage means in said stator and body coincident at the juncture of those members and aligned with said axial bore to form a by-pass passage leading to said inlet port; valve means in said valve bore responsive to flow in said delivery passage to divert fluid therefrom into said axial bore; means in said by-pass passage for inducing a localized relatively high flow rate, said means comprising a venturi member lying within and surrounded by said passage means in the stator; fluid return passage means communicating with said passage means in the stator; and passage means in said venturi member communicating with said passage means in the stator, whereby the velocity effect of the by-passed fluid is utilized to increase the pressure in the inlet zone.

References Cited in the file of this patent

UNITED STATES PATENTS

| | | |
|---|---|---|
| 2,263,913 | Bargeboer | Nov. 25, 1941 |
| 2,380,606 | Moody | July 31, 1945 |
| 2,495,685 | Beaman | Jan. 31, 1950 |
| 2,603,065 | Sarto | July 15, 1952 |
| 2,642,148 | Grise | June 16, 1953 |
| 2,724,335 | Eames | Nov. 22, 1955 |